United States Patent [19]

Tanaka et al.

[11] Patent Number: 5,405,008
[45] Date of Patent: Apr. 11, 1995

[54] PLASTIC CASE AND METHOD FOR MAKING THE SAME

[75] Inventors: Kimio Tanaka, Nagano; Noboru Uemura, Kanagawa; Koji Sasagawa, Chiba, all of Japan

[73] Assignee: TDK Corporation, Tokyo, Japan

[21] Appl. No.: 86,484

[22] Filed: Jul. 1, 1993

[30] Foreign Application Priority Data

Jul. 6, 1992 [JP] Japan .................. 4-200215

[51] Int. Cl.⁶ ........................................... B65D 85/575
[52] U.S. Cl. .................. 206/459.5; 206/387.1
[58] Field of Search ............... 206/307, 309, 310, 387, 206/444, 459.5

[56] References Cited

U.S. PATENT DOCUMENTS

| | | | |
|---|---|---|---|
| 4,479,579 | 10/1984 | Miklos | 206/459.5 |
| 4,555,021 | 11/1985 | Fujii | 206/387 |
| 4,789,058 | 12/1988 | Blaney | 206/387 |
| 4,796,753 | 1/1989 | Fujii | 206/387 |
| 5,097,952 | 3/1992 | Katagiri | 206/387 |
| 5,103,978 | 4/1992 | Secor | 206/459.5 |

FOREIGN PATENT DOCUMENTS 1-255521 10/1989 Japan .
2-63721 3/1990 Japan .

*Primary Examiner*—Jimmy G. Foster
*Attorney, Agent, or Firm*—Panitch Schwarze Jacobs & Nadel

[57] ABSTRACT

In making a plastic case from a molten plastic material, a molten sheet of the material is passed through a nip of a pair of molding cylinders to form a sheet of desired thickness which in turn cut into blanks. A half tone indication is formed by using a cylinder having an indication-forming part which is comprised of a mat surface and a number of elongated projections having a glossy top surface. Half tone is obtained by this simple process.

10 Claims, 2 Drawing Sheets

PLASTIC CASE AND METHOD FOR MAKING THE SAME

BACKGROUND OF THE INVENTION

Field of the Invention

The present invention relates to a plastic case and a method for making the case, and more particularly to a plastic case having markings capable of expressing half tones and method for producing such case.

2. Prior Art

Heretofore, it has been a general practice that video tape cassettes and audio tape cassettes have been protected by housing them in plastic cases so as to protect the tapes from dust or from impairment to the cassettes. On the outer surface of the cases are printed one or more indications or markings such as various characters, words, indices, devices for indicating the contents or expressing trademark, product number or other information, design and the like. However, this requires not only extra step for printing the indications or attaching indications-bearing labels to the plastic case but also extra materials and cost, which obstruct simplification of the manufacturing steps and reduction of the cost. Accordingly, it is desirable to avoid such extra steps and cost.

Printing or labeling may be dispensed with by using a hot stamp method to form indications or markings by pressing a stamping die surface of a heated stamp onto a plastic sheet.

PROBLEMS TO BE SOLVED BY THE INVENTION

The hot stamping method of forming indications or markings by pressing a heated stamp having indications on its surface onto a plastic sheet includes at best preparing a stamping die having a mirror finished surface or a mat surface and transferring the surface pattern onto the surface of the sheet, resulting, however, in an indication which simply gives a uniform appearance throughout the area of the indication.

OBJECTS OF THE INVENTION

An object of the present invention is to provide a method for forming an indication or marking on the surface of a case which gives various degrees of half tone by the presence of two or more differentiated finish areas.

MEANS TO SOLVE THE PROBLEMS

The present invention provides a plastic case having a surface which has at least one indication composed of a number of projections having mat top surface and a number of recesses having a glossy flat bottom between said projections. Preferably, the recesses may be composed of a number of closely spaced elongated parallel grooves. Alternatively, the grooves may comprise two sets of grooves extending in crosswise directions.

The present invention further provides a method for making a plastic case, including steps of supplying a molten plastic material, passing the plastic material through a nip of a pair of molding cylinders to mold the plastic material into a plastic sheet of a predetermined uniform thickness, cooling the resulting sheet and cutting the plastic sheet into a plurality of blanks, and folding the blanks into cases, characterized in that one of the molding cylinders includes at least one indication-forming portion comprised of a number of grooves having a mat bottom and a number of elongated projections having a glossy top surface. The projections may be in the form of closely spaced parallel projections.

FUNCTIONS

According to the present invention, indications or markings of various half tones are obtained by appropriately selecting the pitch, width and depth of the recesses of the case. For example, if the recesses are in the form of closely spaced elongated parallel grooves, the depth, width and spacing of the grooves may be controlled to give different half tone indications at various locations on the surface of the blank.

DETAILED EXPLANATION OF THE PREFERRED EMBODIMENTS

Preferred embodiment of the present invention will now be explained in detail by making reference to the accompanying drawings.

Figure 1:
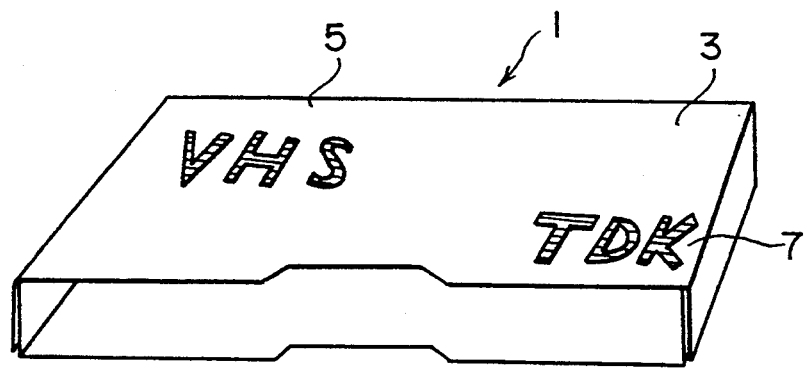
FIG. 1 is a perspective view of a plastic case according to an embodiment of the present invention.

FIG. 1 illustrates a perspective view of a plastic case 1 for housing, for example, a magnetic tape cassette, made of a plastic material such as polypropylene. It is preferable to use an opaque or colored material in order that the indication or marking is clearly perceivable. As will be explained in more detail, the plastic case may be produced from a length of a molten plastic sheet by using a molding process in which pressing cylinders are used. The plastic case 1 is produced by folding up a blank (a sheet cut into a shape having a contour of an unfolded case) into the form of the case and welding or adhering superposed lateral flaps together. The overall outer surface 3 of the plastic case 1 is mat-finished on which various indications or markings 5 and 7 such as designs, characters, symbols, words and the like are formed during the blank formation process. As will be described, these indications may be formed in such manner that they have different half tones and accordingly the indications 5 and 7 are designs or characters of different appearance.

Figure 2:
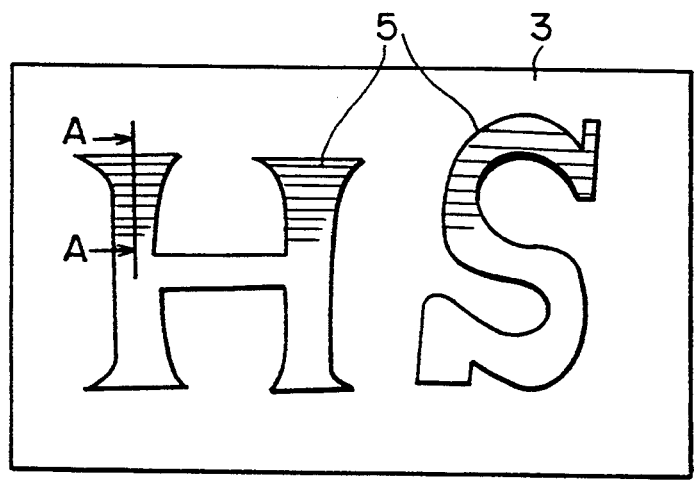
FIG. 2 is an enlarged plane view of the indications or markings of the plastic case of FIG. 1.
Figure 3:
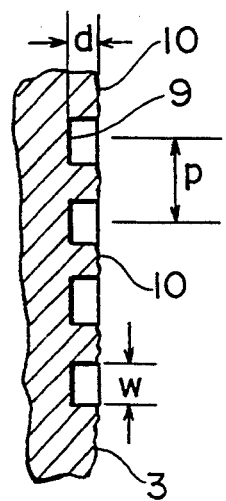
FIG. 3 is an enlarged cross sectional view taken along the line A—A of FIG. 2.

FIG. 2 is an enlarged plane view of the indications or markings 5 of FIG. 1 and FIG. 3 is an enlarged cross sectional view taken along the line A—A of FIG. 1. More specifically, the characters 5 are comprised of a number of closely spaced elongated parallel grooves 9 and projections or ridges 10 between the grooves. The bottom of each groove is a mirror-finished flat surface and the top of each of the projections 10 is mat-finished similarly to the surface 3 and lies in a plane flush with the outer surface 3 of the case 1. By appropriately selecting the depth d, width w and the pitch p of the grooves or the projections, the tone of the characters 5 can be suitably adjusted to a desired tone. Half tone can be expressed by the contrast between the mirror-finish bottom surface 9 and the mat top surface of the projections 10. Alternatively, the bottom of the grooves may be mat-finished and the top surface of the grooves may be mirror-finished. The reason why the bottom of the grooves and the top of the projections are planar is that the formation of the markings can be easily done. Molding cylinders having bottom or top having circular, polygonal or other different profile are difficult to make.

Figure 4:
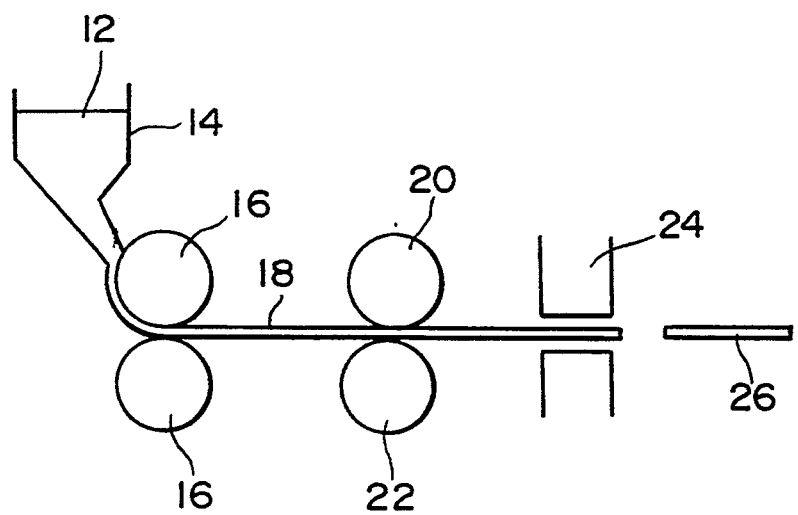
FIG. 4 is a general view showing the production process of the plastic case according to the present invention.
Figure 5:
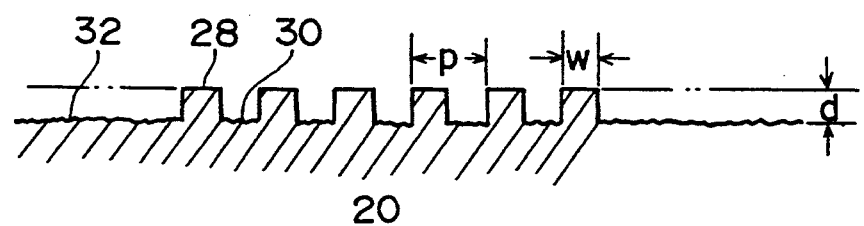
FIG. 5 is an enlarged cross sectional view of the cylinder of FIG. 4.

FIG. 4 shows a schematic view of the method according to the present invention. A molten plastic material 12 such as polypropylene is supplied from a raw material container 14 to a pair of cylinders 16 where the molten plastic material 12 is squeezed and molded into a sheet 18 having a thickness slightly larger than final sheet. The sheet 18 is then passed through the nip of a pair of molding cylinder 20 and a back-up cylinder 22. As shown in FIG. 5, the cylinder 20 is provided with an overall mat surface 32 having a predetermined uniform roughness. The cylinder 20 further includes indication-forming portion comprised of a number of closely spaced grooves 30 having a mat-finished bottom lying in the same cylindrical plane as the mat surface 32 and a number of projections or ridges 28 having a mirror-finished flat top between the grooves. These grooves 30 and the projections 28 correspond respectively to the projections 10 and the grooves 9 of the indications 5 and 7 (FIGS. 1-2) to be formed on the plastic blanks. The dimensions of the projections 28 are selected so as to have a width w, height d and pitch p in such manner that the grooves and the projections are complementary to the projections and the grooves of the plastic blanks to be formed. After passing through the press or molding cylinders 20 and 22 the sheet is cooled and cut by a cutting die 24 to separate blanks 26. Thereafter, the blanks are folded into a case and welded or adhered at lateral superposing flaps.

As shown in FIG. 5, the grooves 30 and the projections 28 are flat (More precisely, flat in the axial direction and cylindrical in the angular direction). This is because it is the most convenient to work the surface of the cylinder 20. Namely, the mirror-finished cylinder having a diameter shown by a chained line is covered with a resist only at the area corresponding to the projections of the cylinder 20 and the surface of the cylinder is subjected to etching operation with liquid or gas etchant to remove a part of the surface layer to give a mat-finished surface, whereby the cylinder 20 of the shown structure is easily obtained.

From the foregoing, with the plastic case according to the present invention, the characters 5 and the characters 7 can be made to have different tones by appropriately selecting the depth d, the width d and the pitch p of the grooves 9. Further, a good contrast can be obtained to express half tone or half tones by providing the grooves 9 having a mirror-finished (or mat-finished) bottom and the projections 10 having a mat-finished (or mirror-finished) top 10 similar to the mat surface 3 of the case. Moreover, a molding cylinder can be easily made by providing the grooves 30 having a mirror-finished (or mat-finished) bottom similar to the surface 32 and the projections 28 having a mat-finished (or mirror-finished).

It should be noted that the present invention may have a number of modifications without departing from the spirits of the present invention and the scope of the accompanying claims.

It is claimed:

1. A plastic case having an outer mat surface which has at least one indication thereon, said indication comprising:
    a number of projections each having a mat top surface flush with said outer surface; and
    a number of recesses having a glossy flat bottom surface between said projections.

2. A plastic case having an outer surface according to claim 1, wherein the projections are closely spaced elongated parallel projections and the recesses are elongated closely spaced parallel grooves.

3. The plastic case according to claim 2, wherein said grooves comprise two sets of grooves extending in a crosswise direction.

4. A plastic case according to claim 1, wherein said parallel recesses are different in depth, width and spacing depending on the locations, thereby expressing different half tones depending on the locations.

5. The plastic case according to claim 1, wherein the plastic comprises an opaque plastic material.

6. A plastic case having an outer glossy surface which has at least one indication thereon, said indication comprising:
    a number of projections having a glossy top surface flush with said outer surface; and
    a number of recesses having a mat flat bottom surface between said projections.

7. A plastic case having an outer surface according to claim 6, wherein the projections are closely spaced elongated parallel projections and the recesses are elongated closely spaced parallel grooves.

8. The plastic case according to claim 7, wherein said grooves comprise two sets of grooves extending in a crosswise direction.

9. A plastic case according to claim 6, wherein said parallel recesses are different in depth, width and spacing depending on the locations, thereby expressing different half tones depending on the locations.

10. The plastic case according to claim 6, wherein the plastic comprises an opaque plastic material.

* * * * *